United States Patent [19]
Oeynhausen

[11] Patent Number: 5,954,434
[45] Date of Patent: Sep. 21, 1999

[54] DEVICE AND PROCESS FOR DISCHARGING A LIQUID LUBRICANT FROM A BEARING CONFIGURATION

[75] Inventor: Heinrich Oeynhausen, Mülheim an Der Ruhr, Germany

[73] Assignee: Siemens Aktiengesellschaft, Munich, Germany

[21] Appl. No.: 09/136,511

[22] Filed: Aug. 19, 1998

Related U.S. Application Data

[63] Continuation of application No. PCT/DE97/00262, Feb. 12, 1997.

[30] Foreign Application Priority Data

Feb. 19, 1996 [DE] Germany .................. 196 06 088

[51] Int. Cl.⁶ .................................................. F16C 17/02
[52] U.S. Cl. .......................... 384/398; 384/397; 384/400
[58] Field of Search ..................................... 384/398, 400, 384/397, 401, 414, 322

[56] References Cited

U.S. PATENT DOCUMENTS 4,741,630  5/1988  Oeynhausen et al. .................. 384/397

FOREIGN PATENT DOCUMENTS

| 0 306 634 | 3/1989 | European Pat. Off. . |
| 378896 | 8/1923 | Germany . |
| 952 756 | 11/1956 | Germany . |
| 30 07 092 | 9/1980 | Germany . |
| 2 111 608 | 7/1983 | United Kingdom . |

OTHER PUBLICATIONS

Published International Patent Application WO 94/01713 (Haase), dated Jan. 20,1994.

*Primary Examiner*—Lenard A. Footland
*Attorney, Agent, or Firm*—Herbert L. Lerner; Laurence A. Greenberg

[57] ABSTRACT

A device for discharging a liquid lubricant from a bearing configuration for a shaft which rotates around an axis, in particular for a steam turbine. The bearing configuration has a bearing, upon which the lubricant acts and which mounts the shaft, at least one seal, which is adjacent to the bearing and encircles the shaft, and a collecting chamber which is assigned to a first end of the bearing and encircles the shaft. The lubricant that escapes at the first end can be intercepted and channeled away by way of the collecting chamber. A lubricant sump chamber is provided geodetically beneath the bearing and is connected to a lubricant outflow. The collecting chamber has a deflection duct that extends through the lubricant sump chamber and is intended for channeling away the lubricant into the lubricant outflow. There is also taught a process for discharging a liquid lubricant from the bearing configuration.

11 Claims, 2 Drawing Sheets

DEVICE AND PROCESS FOR DISCHARGING A LIQUID LUBRICANT FROM A BEARING CONFIGURATION

CROSS-REFERENCE TO RELATED APPLICATION

This is a continuation of International Application No. PCT/DE97/00262, filed on Feb. 12, 1997, which designated the U.S.

BACKGROUND OF THE INVENTION

Field of the Invention

The invention relates to a device for discharging a liquid lubricant, in particular bearing oil, from a bearing configuration for a shaft which rotates around an axis. The bearing configuration has a bearing, upon which the liquid lubricant acts and which mounts the shaft, at least one seal, which is adjacent to the bearing and encircles the shaft, and a collecting chamber for intercepting and channeling away escaping lubricant. The invention also relates to a process for discharging a liquid lubricant from the bearing configuration, in particular for a shaft of a steam turbine.

The invention is concerned, in particular, with sliding-bearing configurations in a turbine installation, in particular in a steam-turbine installation. Sliding-bearing configurations which can be used in turbine installations and a process and a device for discharging liquid lubricant, in particular lubricating oil, from such sliding-bearing configurations can be gathered, for example, from Published European Patent Application EP 0 306 634 A2, corresponding to U.S. Pat. No. 4,741,630, and from Published International Patent Application WO 94/01713 A1, corresponding to U.S. Pat. No. 5,494,355.

A contactless shaft seal with a leakage-oil discharge that ensures a rapid discharge of the bearing oil flowing off from the sliding-bearing surfaces in the case of a sliding bearing for turbomachines, in particular steam turbines, in a wide speed range, starting from rest and going beyond the turnover speed up to the operational speed (e.g. 3000 rpm) is described in the Published European Patent Application EP 0 306 634 A2. Provided for this purpose is a device with an oil-collecting annular duct that is made in an arcuate section in the form of a slot-like opening curve. This results in the opening curve passing over a circumferential angle region of the shaft which begins at the geodetically lowest point of the annular-duct outer contour and extends, as seen in the direction of rotation of the shaft, at most up to the bearing-shell joint of the oil-collecting annular duct. For a discharge of leakage oil which has penetrated into the seal of the sliding bearing, a leakage-oil collecting chamber is welded on geodetically beneath the seal. The leakage-oil collecting chamber opens out, via axially oriented suction-removal bores, into suction-producing drive nozzles which are located, in the form of suction caps, in the oil outflow of the oil-collecting annular duct. This is also intended to discharge the leakage oil to a certain extent from the seals assigned to the sliding bearings.

A process and a device for discharging lubricant, in particular bearing oil, from a bearing configuration, in particular an end journal bearing of a steam turbine is specified in the Published International Patent Application WO 94/01713 A1. In this case, the end journal bearing is assigned a seal that encircles the turbine shaft. Provided therebetween is a collecting chamber that encircles the shaft and into which the lubricant that escapes from the bearing along the shaft flows and from which the lubricant is discharged. The lubricant is discharged from the collecting chamber without any great loss in speed. The bearing oil is fed to a flow-off line by way of an injection line. The configuration has an injection line and a flow-off line forming a suction-action-producing jet pump.

SUMMARY OF THE INVENTION

It is accordingly an object of the invention to provide a device and process for discharging a liquid lubricant from a bearing configuration which overcome the above-mentioned disadvantages of the prior art devices and methods of this general type, in which lubricant escaping from the bearing is discharged in an accelerated manner with a low degree of outlay in terms of equipment.

With the foregoing and other objects in view there is provided, in accordance with the invention, in a bearing configuration for rotatably mounting a shaft about an axis, the bearing configuration having a bearing with a first end receiving a liquid lubricant and at least one seal disposed adjacent the bearing and encircling the shaft, a device for discharging the liquid lubricant from the bearing configuration, the device including: a collecting chamber having a deflection duct associated with the first end of the bearing, the collecting chamber encircling the shaft for collecting and channeling away the liquid lubricant escaping at the first end; a lubricant outflow; and a lubricant sump chamber disposed geodetically beneath the bearing and communicating with the lubricant outflow, the deflection duct of the collecting chamber extending through the lubricant sump chamber to the lubricant outflow for channeling away the liquid lubricant in an accelerated manner.

In this case, the pulse (velocity) of the escaping lubricant, in particular the bearing oil, is exploited. When it escapes from the bearing, the lubricant is provided with a pulse since it is thrown off tangentially from the rotating shaft. This results in the escaping lubricant having a high speed in the tangential direction. The speed is largely maintained by the deflection curve resulting in the lubricant flowing off out of the collecting chamber in an accelerated manner. The collecting chamber with the adjoining deflection curve acts together with the lubricant outflow as an injector and accelerates the lubricant which escapes at a second end of the bearing, which is located opposite the first end. The lubricant flows directly into the lubricant sump chamber, which is formed, in particular, by the housing of the bearing. A lubricant sump forms in the lubricant sump chamber during normal operation of the shaft, when the lubricant feed to the bearing configuration is operational. The accelerated discharge of the lubricant, when the shaft is rotating, ensures that the level of the lubricant sump is located geodetically beneath the seal. This effectively prevents lubricant from flowing out of the lubricant sump into the seal. In a steam turbine in which an air chamber connected to a condenser adjoins outside the seal, the undesirable penetration of oil into the condenser is effectively prevented.

In accordance with an added feature of the invention, the bearing has a second end disposed opposite the first end along the axis and fluidically connected to the lubricant sump chamber for channeling the liquid lubricant into the lubricant sump chamber.

In accordance with another feature of the invention, there is a further collecting chamber disposed adjacent to the second end for receiving and channeling away the lubricant escaping from the second end.

The second end of the bearing is preferably constructed such that it is connected directly to the lubricant sump chamber in terms of flow. This permits unobstructed lubricant flow-off, accelerated by the first-end collecting chamber acting as an injector, into the lubricant sump chamber, as a result of which undesirable distribution of the lubricant within the bearing configuration, in particular penetration into a seal of the bearing configuration, is largely avoided.

Undesirable distribution of lubricant escaping from the second end is preferably avoided by the collecting chamber that is adjacent to the second end and is intended for receiving and channeling away lubricant, the collecting chamber ensuring that the lubricant flows off directly into the lubricant sump chamber.

The bearing is preferably disposed between the seal and the collecting chamber that serves as the injector. This ensures that the lubricant that escapes from the bearing in the direction of the seal is discharged in an accelerated manner, with the result that penetration of lubricant into the seal is largely avoided.

In accordance with an addition feature of the invention, the at least one seal has a seal housing and at least two sealing bands with an inter-space formed therebetween encircling the shaft, and including a suction-removal chamber disposed in the seal housing and fluidically connected to the inter-space.

In accordance with yet another added feature of the invention, the suction-removal chamber disposed in the seal housing has a bore formed therein.

For the suction removal of lubricant that has nevertheless penetrated into the seal, a suction-removal chamber is provided directly in the housing of the seal and is connected in terms of flow to an inter-space formed by two adjacent sealing bands that encircle the shaft. A connection in terms of flow is preferably produced by a number of bores in the seal housing. This allows bearing oil that has penetrated into the inter-space to flow off. The seal preferably has a plurality of sealing bands and thus, along the axis of the shaft, a plurality of inter-spaces that are each connected to the suction-removal chamber in terms of flow.

The suction-removal chamber preferably has at least one bore which is made in the seal housing and runs, in particular, in the axial direction. A determination of the number of bores that are to be made takes place in accordance with the quantity of lubricant that may be expected to penetrate into the seal, the thermomechanical loading capacity of the seal housing also being taken into account.

The suction-removal chamber is preferably connected to a suction-removal line that leads through the lubricant sump chamber and opens out into the lubricant outflow, with the result that the cross-section of the latter is narrowed by the suction-removal line. As a result of the slight cross-sectional narrowing, an additional small negative pressure is produced locally in the lubricant outflow. The negative pressure aids the discharge of the lubricant that has penetrated into the seal. The suction removal of the lubricant from the seal, which functions automatically due to the negative pressure, even functions if suction removal of lubricant vapor from the bearing housing should fail. This provides an additional safeguard against the escape of lubricant from the bearing, in particular a sliding bearing, in the steam-turbine-installation exhaust-steam chamber adjoining the seal. This also reliably avoids the situation where a condenser that is connected to the exhaust-steam chamber is wetted with lubricant, since wetting reduces the efficiency of the steam turbine. In comparison with a bearing configuration in which the lubricant flows out of the bearing merely as a result of the force of gravity, the suction removal of the lubricant that has penetrated into the seal is accelerated by the collecting chamber with deflection curve, which acts as the injector.

The device is preferably suitable for providing a serviceable bearing configuration, in particular a sliding-bearing configuration, in a turbine installation, in particular a steam-turbine installation. The device is particularly suitable for highly loaded turbine installations in power stations and the like. It is particularly suitable for providing a serviceable sliding-bearing configuration in an end journal bearing of a turbine installation, which end journal bearing is disposed in a steam-filled steam chamber of the turbine installation. Of course, a bearing configuration may have further components in addition to those mentioned hitherto. In a large number of steam turbines, the seals in the bearing configuration are of a multi-part and/or structured construction. Thus, it is often the case that, as seen along the shaft, a plurality of sealing sections are located between the interior of a turbine and the bearing and chambers are disposed between them, which chambers, depending on the construction and function, are provided with steam, evacuated or admit air. This makes it necessary, in each part-seal, to allow a leakage current with certain properties, in particular a defined size, defined direction and defined composition to develop. And to channel the lubricant leakage currents out of the seal at certain locations and to be able to pass them on for further treatment in accordance with their respective composition.

With the foregoing and other objects in view there is provided, in accordance with the invention, a process for discharging a liquid lubricant from a bearing configuration supporting a shaft rotatable around an axis, the bearing configuration having a bearing with a first end receiving the liquid lubricant and at least one seal disposed adjacent to the bearing and encircling the shaft, which includes: forming a collecting chamber encircling the shaft and communicating with the first end of the bearing; intercepting and channeling away the liquid lubricant escaping at the first end of the bearing with the collecting chamber; and feeding the liquid lubricant in an accelerated manner to a lubricant outflow from the collecting chamber via a deflection duct extending through a lubricant sump chamber located geodetically beneath the bearing.

Accelerated discharge of the lubricant is achieved by such a collecting chamber that is provided with a deflection duct and exploits the high tangential flow speed of the escaping lubricant. The deflection curve preferably opens out in the vertical direction into a vertically running lubricant outflow, the latter being connected to the lubricant sump chamber, which is partially filled with lubricant. The deflection curve, which leads through the lubricant sump chamber and opens out into the lubricant outflow, produces a negative pressure in the lubricant outflow. The negative pressure causing lubricant to flow off out of the lubricant sump chamber in an accelerated manner. This keeps the level of the lubricant in the lubricant sump chamber geodetically beneath the seal, with the result that lubricant does not penetrate, from the lubricant sump, into the seal and flow through the latter.

In accordance with a further additional feature of the invention, there is the step of feeding the liquid lubricant escaping from a second end of the bearing located opposite the first end along the axis directly to the lubricant sump chamber with the deflection duct opening out into a region of the lubricant sump chamber and filling the region with the liquid lubricant.

In accordance with a concomitant feature of the invention, there are the steps of channeling the liquid lubricant out of an inter-space formed between two sealing bands of the at least one seal into a suction-removal chamber; and diverting the liquid lubricant from the suction-removal chamber into the lubricant outflow via a suction-removal line traversing through the lubricant sump chamber.

The lubricant sump chamber is filled with the lubricant, in particular bearing oil, which escapes from the second end of the bearing, which is located opposite the first end along the axis. The feeding of the escaping lubricant is ensured by a free connection in terms of flow between the second end and the lubricant sump chamber. For this purpose, it is possible to provide a further collecting chamber, which encircles the shaft and from which the lubricant flows into the lubricant sump chamber.

The lubricant which penetrates into the inter-space between two sealing bands of the seal is channeled into a suction-removal chamber, in particular an axial bore, located in the housing of the seal. From there, the lubricant flows into the lubricant outflow via a suction-removal line that leads through the lubricant sump chamber. The suction-removal line, which opens out into the lubricant outflow, produces an additional negative pressure, which causes the lubricant that has penetrated into the seal to be discharged in an accelerated manner.

Other features which are considered as characteristic for the invention are set forth in the appended claims.

Although the invention is illustrated and described herein as embodied in a device and process for discharging a liquid lubricant from a bearing configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
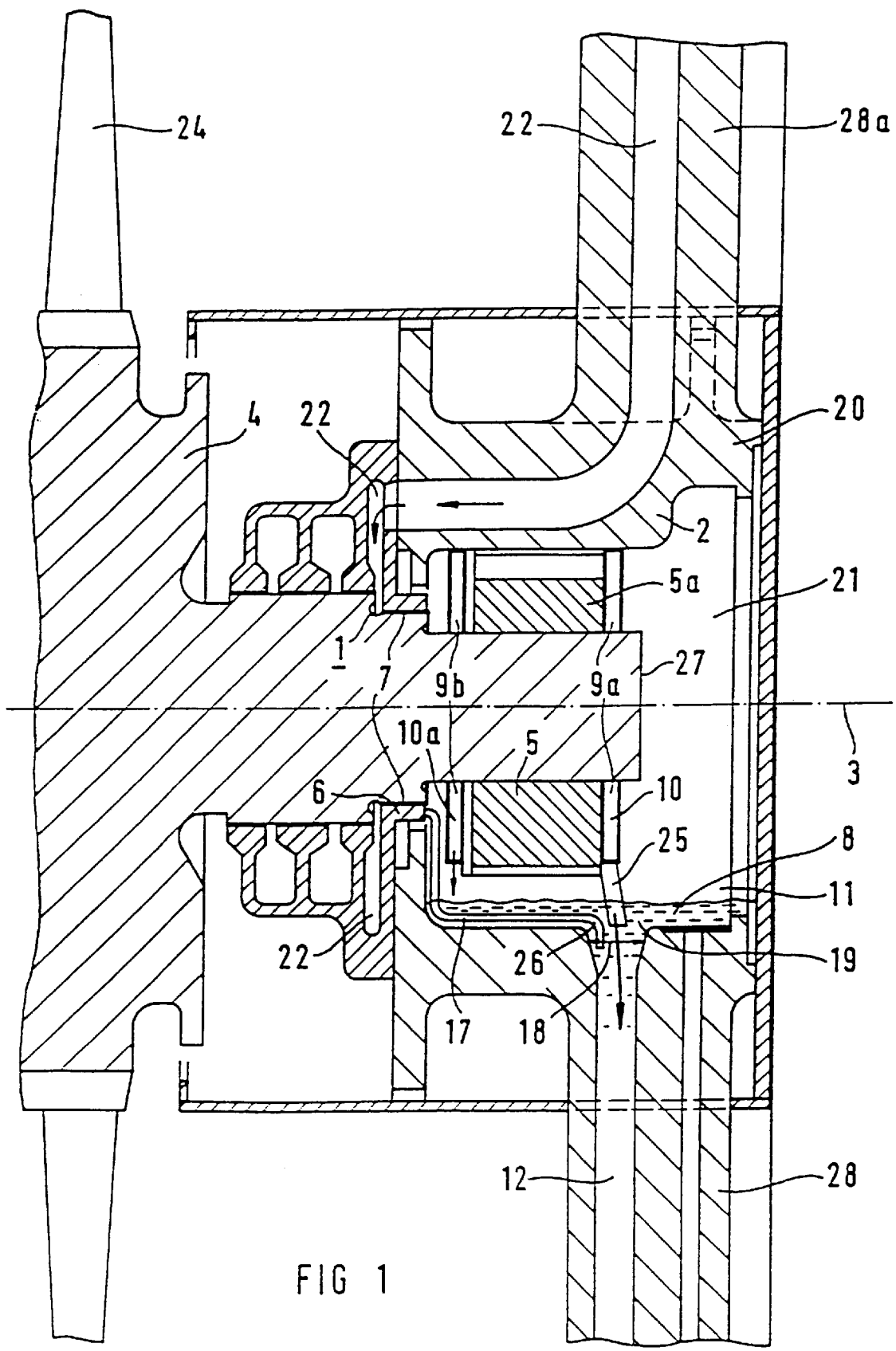
FIG. 1 is a longitudinal-sectional view of a bearing configuration of an end journal bearing of a steam turbine along an axis of a turbine shaft.

Referring now to the figures of the drawing in detail and first, particularly, to FIG. 1 thereof, there is shown an end region of a steam-turbine shaft 4 extending along an axis 3. The turbine shaft 4 is mounted on a bearing configuration 2 having a bearing 5, which is constructed as a sliding bearing and is enclosed by a bearing housing 20, and a seal 7, which seals the bearing housing 20 on the shaft 4. The bearing configuration 2 has a device 1 for discharging a lubricant 8, in particular bearing oil, from the bearing housing 20. The seal 7 and the bearing 5 encircle the turbine shaft 4 in a circular-cylindrical manner. The bearing 5 has a lubricant feed (not illustrated) by which the lubricant 8 is fed to the bearing 5 during normal operation of the steam-turbine installation. The lubricant 8 escapes at a first end 9a of the bearing 5, which is assigned to the end side 27 of the turbine shaft 4, and from a second end 9b, which faces the seal 7. Disposed directly at the first end 9a is a collecting chamber 10 for receiving the lubricant 8 that escapes from the bearing 5 at a high tangential speed. The collecting chamber 10 has a deflection duct 25 at its geodetically lowest point. The lubricant 8 is channeled away by way of the deflection duct 25. The deflection duct 25 is guided essentially vertically through a lubricant sump chamber 11, which is located geodetically beneath the bearing 5, and opens out at an essentially vertically running lubricant outflow 12. The lubricant outflow 12 is cast in a support 28 of the bearing housing 20. The lubricant outflow 12 extends geodetically downwards directly from the lubricant sump chamber 11. A collecting chamber 10a, for receiving and channeling away the lubricant 8 which escapes from the second end 9b, is likewise provided at the second end 9b. The collection chamber 10a ensures that the lubricant 8 flows off into the lubricant sump chamber 11 in an essentially unobstructed manner. The sump chamber 11 thus being filled with the lubricant 8, in particular bearing oil, during the normal operation of the steam-turbine installation, up to a corresponding level located geodetically beneath the seal 7. The bearing housing 20, which encloses an end journal bearing 5a, is disposed in a steam chamber of the steam-turbine installation, in particular in an exhaust-steam connection piece. The bearing configuration 2 is held in the steam chamber via the supports 28, 28a. One or more of the supports 28 being hollow and containing, in particular, the lubricant outflow 12. The bearing housing 20 serves, in particular, to keep the steam away from the bearing configuration 2. An air feed 22 is guided through the bearing housing 20 and opens out in the surroundings of the seal 7, outside the bearing housing 20. The air feed 22 is guided through a further support 28a. The bearing housing 20 is connected to oil-vapor suction-removal devices 21, with the result that a slight negative pressure always prevails in the bearing housing 20. The seal 7 is a contactless shaft seal, which is illustrated in more detail in FIG. 2, with a seal housing 6 which prevents the escape of the steam or the admission of air and the escape of the lubricant 8, in particular oil or oil vapor. Provided outside of the bearing housing 20, between the seal 7 and that part of the turbine shaft 4 which bears moving blades 24, are the suction-removal devices and feeds for waste steam and gland steam (which are not illustrated in any more detail).

Connected to the seal 7 in order to discharge the lubricant 8 that has penetrated into the seal 7 is a suction-removal line 17. The suction-removal line 17 is guided in the lubricant sump chamber 11, through a region 19 filled with the lubricant 8, and opens out, by a bend 26, essentially vertically into the lubricant outflow 12. This reduces a cross-section 18 of the lubricant outflow 12, as a result of which an additional negative pressure is produced. The collecting chamber 10, with the deflection duct 25 disposed thereon, and the seal 7, with the suction-removal line 17 connected thereto, form part of the device 1 for discharging lubricant 8 in an accelerated manner.

The bearing oil 8 escapes at the ends 9a, 9b of the bearing 5 of a sliding bearing and, as a result of the rotation of the turbine shaft 4, has a high speed in a circumferential direction. The bearing oil 8 is intercepted in the collecting chamber 10 and is channeled into the lubricant outflow 12 by way of the deflection curve 25. The configuration includes the collecting chamber 10, the deflection curve 25 and the lubricant outflow 12 and acts as an injector and accelerates the bearing oil 8 that escapes at the second end 9b. The bearing oil 8 is then channeled directly into the lubricant sump chamber 11 and is present there as an oil sump. The discharge for the lubricant 8, bearing oil, which is thus formed with a low degree of outlay in terms of equipment functions, independently of the oil-vapor suction-removal devices 21, by virtue of the rotation of the turbine shaft 4 alone.

Figure 2:
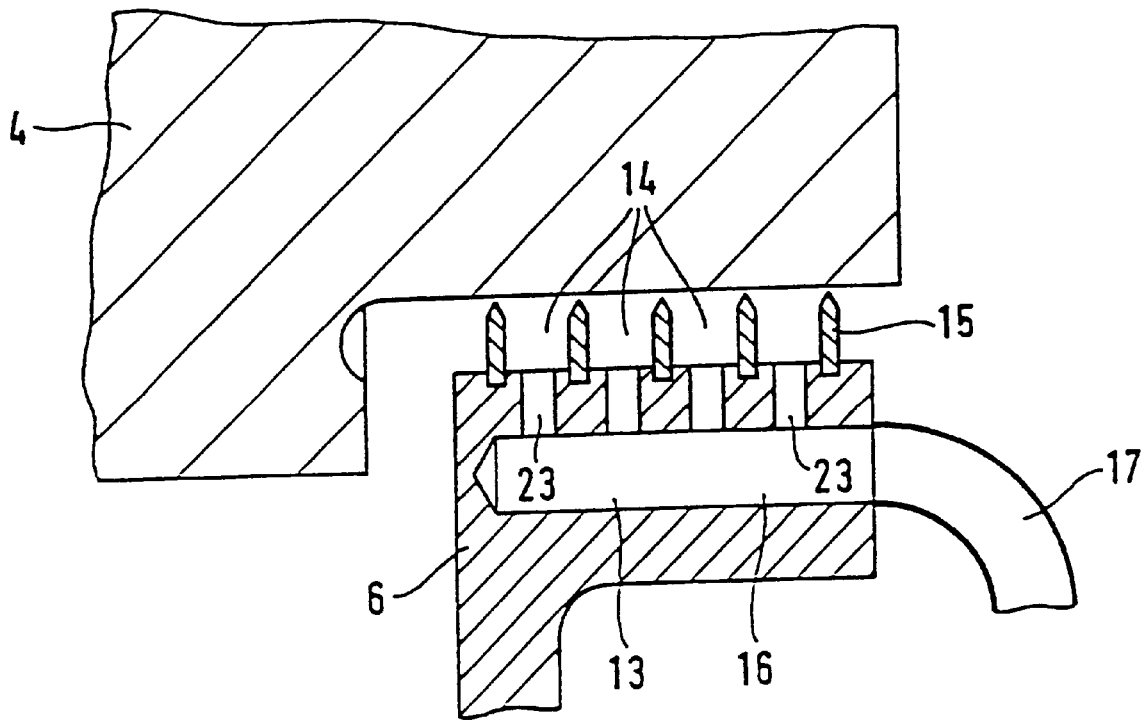
FIG. 2 is an enlarged, longitudinal-sectional view of a region of a bearing seal.

FIG. 2 illustrates the seal 7 according to FIG. 1 on an enlarged scale. The seal 7 has the seal housing 6 on which a plurality of sealing bands 15 are disposed, so as to encircle the seal housing 6, along the turbine shaft 4. The seal 7 is a contactless lip seal. An inter-space 14 is formed in each case between adjacent sealing bands 15. The seal housing 6 has a suction-removal chamber 13, which is connected to a plurality of the inter-spaces 14 by a respective branch bore 23. The suction-removal chamber 13 has a bore 16 or a plurality of bores 16, each made in the axial direction in the seal housing 6 parallel to the axis 3. A respective bore 16 is adjoined by the above-described suction-removal line 17. Of course, it is likewise possible, in the case of a multiplicity of bores 16, to connect them to a common duct, to which the suction-removal line 17 is then connected.

The suction-removal chamber 13, which is made directly in the seal housing 6 and is connected to the inter-spaces 14 in terms of flow, ensures that the lubricant 8, in particular leakage oil, which has penetrated into the seal 7 is removed by suction. This effectively prevents the situation where, from the bearing 5 in the direction of the air feed 22, the inter-spaces 14 fill up gradually and the lubricant 8 ultimately escapes from the bearing housing 20. By way of the bore 16 in the seal housing 6, the lubricant 8 is channeled out of the inter-spaces 14, via the suction-removal line 17, into the lubricant outflow 12. As a result of the suction-removal line 17 opening out into the lubricant outflow 12 in the region of the deflection curve 25, a cross-sectional narrowing is produced, and this produces an additional negative pressure locally. Due to the negative pressure, the lubricant 8 which has penetrated into the seal 7 is discharged not only as a result of the force of gravity, but also due to a specific suction-removal operation. This suction-removal operation is further aided by the collecting chamber 10 with the deflection curve 25, which acts as the injector. The suction-removal operation functions independently of the oil-vapor suction-removal devices 21 and thus contributes to an additional safeguard against oil escaping from a sliding bearing 5 in an exhaust-steam chamber of a steam turbine.

I claim:

1. In a bearing configuration for rotatably mounting a shaft about an axis, the bearing configuration having a bearing with a first end receiving a liquid lubricant and at least one seal disposed adjacent the bearing and encircling the shaft, a device for discharging the liquid lubricant from the bearing configuration, the device comprising:

a collecting chamber having a deflection duct associated with the first end of the bearing, said collecting chamber encircling the shaft for collecting and channeling away the liquid lubricant escaping at the first end;

a lubricant outflow; and a lubricant sump chamber disposed geodetically beneath the bearing and communicating with said lubricant outflow, said deflection duct of said collecting chamber extending through said lubricant sump chamber to said lubricant outflow for channeling away the liquid lubricant in an accelerated manner.

2. The device according to claim 1, wherein the bearing has a second end disposed opposite the first end along the axis and fluidically connected to said lubricant sump chamber for channeling the liquid lubricant into said lubricant sump chamber.

3. The device according to claim 2, including a further collecting chamber disposed adjacent to the second end for receiving and channeling away the lubricant escaping from the second end.

4. The device according to claim 1, wherein the bearing is disposed between the at least one seal and said collecting chamber.

5. The device according to claim 1, wherein the at least one seal has a seal housing and at least two sealing bands with an inter-space formed therebetween encircling the shaft, and including a suction-removal chamber disposed in the seal housing and fluidically connected to the inter-space.

6. The device according to claim 5, wherein said suction-removal chamber disposed in the seal housing has a bore formed therein.

7. The device according to 5, including a suction-removal line connected to said suction-removal chamber, said suction-removal line traversing through said lubricant sump chamber and opening out into said lubricant outflow, said lubricant outflow having a cross-section, and said suction-removal line opening into said lubricant outflow reducing said cross-section of said lubricant outflow.

8. In a steam-turbine installation having a shaft rotatable about an axis, a bearing configuration comprising:

a bearing having a end journal bearing and a first end for mounting the shaft, said bearing receiving a liquid lubricant;

at least one seal disposed adjacent said bearing and encircling the shaft; and a device for discharging the liquid lubricant from said bearing, including:
- a collecting chamber having a deflection duct associated with said first end of said bearing, said collecting chamber encircling the shaft for collecting and channeling away the liquid lubricant escaping at said first end;
- a lubricant outflow; and
- a lubricant sump chamber disposed geodetically beneath said bearing and connected to said lubricant outflow, said deflection duct of said collecting chamber extending through said lubricant sump chamber to said lubricant outflow for channeling away the liquid lubricant in an accelerated manner.

9. A process for discharging a liquid lubricant from a bearing configuration supporting a shaft rotatable around an axis, the bearing configuration having a bearing with a first end receiving the liquid lubricant and at least one seal disposed adjacent to the bearing and encircling the shaft, which comprises:

forming a collecting chamber encircling the shaft and communicating with the first end of the bearing;

intercepting and channeling away the liquid lubricant escaping at the first end of the bearing with the collecting chamber; and feeding the liquid lubricant in an accelerated manner to a lubricant outflow from the collecting chamber via a deflection duct extending through a lubricant sump chamber located geodetically beneath the bearing.

10. The process according to claim 9, which comprises feeding the liquid lubricant escaping from a second end of the bearing located opposite the first end along the axis directly to the lubricant sump chamber with the deflection duct opening out into a region of the lubricant sump chamber and filling the region with the liquid lubricant.

11. The process according to claim 9, which comprises:

channeling the liquid lubricant out of an inter-space formed between two sealing bands of the at least one seal into a suction-removal chamber; and diverting the liquid lubricant from the suction-removal chamber into the lubricant outflow via a suction-removal line traversing through the lubricant sump chamber.

* * * * *